Patented Oct. 15, 1940

2,218,018

UNITED STATES PATENT OFFICE 2,218,018

MANUFACTURE OF HALOGENATED HYDROCARBONS

Oliver W. Cass, Niagara Falls, N. Y., assignor to E. I. du Pont de Nemours and Company, Wilmington, Del., a corporation of Delaware No Drawing. Application May 2, 1938,
Serial No. 205,569

14 Claims. (Cl. 260—652)

This invention is concerned with the preparation of certain halogenated hydrocarbon compounds. More particularly, it relates to the preparation of dihalogen substituted butanes from readily available and relatively inexpensive starting materials by a simple and direct process resulting in substantially quantitative yields.

The preparation of 1,4-substituted dihalogen butane by various methods is already known to organic chemistry. 1,4-dibromo butane, for example, has been prepared by reacting 1,4-dihydroxy butane, or ethers or esters of this compound, with hydrogen bromide. The same dibromo butane has been prepared by internal rearrangement of 2,3-dibromo butane, and by distilling benzoyl pyrolidine with phosphorus pentabromide. Various other dihalogen butanes, such as the 1,4-dichloro butane, have been prepared by analogous methods. The yields secured by the processes now known to the art are not sufficiently high to be satisfactory from the commercial viewpoint, however, and, in addition, the cost of the desired products is substantially increased by the necessity of utilizing relatively expensive starting materials. Many of these methods are also objectionable in that they are too complicated to permit ready application in commercial manufacturing operations.

It is one of the objects of this invention to develop a method for the preparation of dihalogen butane, more particularly 1,4-dihalogen butane, which is readily carried out with relatively high yields. Another object of this invention is to utilize in the preparation of these 1,4-dihalogen butanes the relatively inexpensive starting material tetramethylene oxide. Still another object of this invention is the utilization of tetramethylene oxide in a relatively simple and direct process, giving very satisfactory overall yields, for the preparation of the various 1,4-dihalogen butanes. Other objects of this invention will be apparent from the ensuing disclosure.

Tetramethylene oxide (tetrahydrofurane) is a cyclic hydrocarbon having the following structural formula:

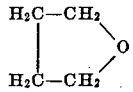

I have now observed that this compound can be reacted with hydrohalogen acids in the presence of a dehydrating agent to yield the corresponding 1,4-substituted dihalogen butane. It has been further observed that the reaction takes place readily and that yields approaching quantitative yields can be secured.

Although not essential, the reaction is preferably carried out by heating the reaction mixture containing the dehydrating agent, hydrohalogen acid and tetramethylene oxide. High yields are obtained, and the period of time necessary for substantial completion of the reaction very effectively shortened, by refluxing the reaction mixture.

Many dehydrating agents may be utilized in the process. I prefer to utilize sulfuric acid as the dehydrating agent, however, in view of its relatively high dehydrating action and relatively low cost. Other acids such as glacial acetic acid may also be used.

When utilizing sulfuric acid as the dehydrating agent the hydrohalogen acid, such as hydrochloric acid, hydrobromic acid, etc., may be dissolved directly in the sulfuric acid prior to the introduction of the tetramethylene oxide into the reaction mixture. If desired, the hydrohalogen acid may be formed in situ by adding the corresponding metal halide, such as an alkali metal halide, to the sulfuric acid. The hydrohalogen acid results by reaction between the metal halide and sulfuric acid and remains dissolved in the dehydrating agent.

When utilizing glacial acetic acid as the dehydrating agent dilution of this dehydrating agent by the addition of aqueous acid is preferably avoided. The hydrohalogen acid in gaseous anhydrous form is preferably dissolved in the anhydrous acetic acid and this mixture contacted with the tetramethylene oxide.

After preparation of the reaction mixture by the addition of the dehydrating agent to the hydrohalogen acid, the tetramethylene oxide is then preferably added. The resulting mixture may advantageously be heated to a sufficiently high temperature, preferably a temperature at which the mixture is refluxed. The following reaction occurs:

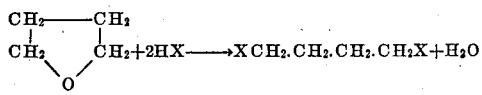

In this equation X represents a halogen. The reaction takes place readily, and proceeds without the maintenance of special pressure conditions and without the necessity for having a catalyst present.

At the completion of the reaction, which at the reflux temperature may require periods ranging from four to seven hours and sometimes even longer, the reaction mixture is permitted to settle. The product, 1,4-dihalogen butane, separates from the aqueous layer and, since its specific gravity is greater than that of the aqueous component present, drops to the bottom of the vessel. It may be removed therefrom by decanting and distilled to recover the 1,4-dihalogen substituted butane in substantially pure form. If desired, the entire mixture may be steam distilled thus recovering the desired halohydrocarbon. This procedure results in a product of high purity which, after separation from the water and drying, needs no further purification.

As I have observed that sulfuric acid is the most satisfactory dehydrating agent, as well as the least expensive, it may be of value to specify suitable concentrations of this dehydrating acid. Although sulfuric acid of widely varying concentrations may be utilized, I prefer to use acid of 50 to 67% $H_2SO_4$ concentration. More concentrated acid can of course be used, but I have found that a concentration within the range specified gives very satisfactory results. When utilizing sulfuric acid of this concentration as the dehydrating agent it is desirable to add it carefully and slowly to the aqueous solution of the metal halide, subsequently cooling the resultant mixture. Ordinarily the temperature of the mixture is considerably raised as the result of the heat of solution of the sulfuric acid. In order to prevent side reactions and carbonization of the tetrahydrofurane, the latter should only be added after the sulfuric acid containing the hydrohalogen acid dissolved therein has been carefully cooled to a temperature below 30° C.

When preparing 1,4-dibromobutane the solution of hydrobromic acid in aqueous sulfuric acid may also be prepared from bromine and sulfur dioxide. A small amount of water is added to cooled bromine and sulfur dioxide passed into the mixture until the characteristic bromine color disappears. To this reaction mixture the tetramethylene oxide may be added in the usual way and the mixture brought rapidly to the reflux temperature. A similar method may be adopted when making 1,4-dichlorobutane, but ordinarily chlorine, water and sulfur dioxide are not reacted as effectively as in the case of bromine. When making the chlorobutane the method previously given of preparing a solution of hydrochloric acid in sulfuric acid is preferred.

As is apparent from the foregoing equation, there are theoretically required two mols of the hydrohalogen acid utilized per mol of tetramethylene oxide. It has been found that a slight excess of the hydrohalogen acid over the theoretical amount gives the most satisfactory yields. Such an excess of acid may range from 5 to 50% over the theoretical amount, corresponding to a molar ratio of acid to tetramethylene oxide ranging from 2.1 to 1 to 3 to 1. It has been observed that an excess of more than 25% over the theoretical quantity of acid required does not markedly increase the yield.

It should be understood that various other ways of contacting the hydrohalogen acid and tetramethylene oxide in the presence of a dehydrating agent may be employed. However, the simplest and most effective way of carrying out this reaction, and the method which employes the least expensive starting materials, is that wherein a metal halide is introduced into sulfuric acid, the mixture carefully cooled, and the tetramethylene oxide then introduced, the mixture being subjected to refluxing. Thus, when making 1,4-dibromo butane, sodium bromide and sulfuric acid constitute the cheapest and most practical source of hydrobromic acid dissolved in a dehydrating agent, the reaction mixture into which the tetramethylene oxide is introduced.

It has been observed that most satisfactory yields are secured when the reaction mixture, after the addition of the tetramethylene oxide, is rapidly brought to the reflux temperature.

Although it is not desired to limit the invention to the specific details, temperatures, procedures and amounts included merely as illustrative in the following examples, these examples present further details regarding the improved method of making 1,4-dihalogen butane.

Example I

A solution of hydrobromic acid in sulfuric acid was prepared by introducing 435 g. of sodium bromide and 503 cc. of water into a glass-lined reaction vessel. The mixture was stirred until all the sodium bromide had gone into solution. Sulfuric acid of gravity 1.84 in the amount of 548 cc. was then very slowly added, with stirring, to the mixture. The mixture was cooled, during this phase, to a temperature of 30° C.

To the cooled mixture comprising hydrogen bromide and sulfuric acid as a dehydrating agent, the tetramethylene oxide in the amount of 144 g. was added. The mixture was thoroughly stirred, and rapidly heated to the reflux temperature and refluxed for 4 hours. During this time the temperature of reflux rises from one within the range to 60 to 70° C. to one above 95° C.

At the end of 4 hours the reaction mixture was steam distilled and the formed 1,4-dibromo butane separated in pure form from the lighter water layer. The yield of 1,4-dibromo butane was 402 g., corresponding to a percentage yield of 93.5% based on the quantity of tetramethylene oxide reacted. The 1,4-dibromo butane is a heavy, colorless oil. The reaction mixture was substantially free from unreacted tetramethylene oxide.

Example II

A procedure was followed substantially similar to that disclosed in Example I. The following was reacted:

| | | |
|---|---|---|
| Sodium bromide | g | 454 |
| Water | cc | 528 |
| Sulfuric acid | cc | 572 |
| Tetramethylene oxide | g | 144 |

The yield of 1,4-dibromo butane secured was 409 g., which is a yield of 95.2% based on the tetramethylene oxide. Substantially no unconverted tetramethylene oxide was present.

Example III

The procedure followed was the same as that disclosed in Example I, except that 1,4-dichloro butane was prepared. The following reaction mixture was utilized:

| | | |
|---|---|---|
| Sodium chloride | g | 90 |
| Water | cc | 200 |
| Sulfuric acid | cc | 170 |
| Tetramethylene oxide | g | 36 |

The temperature at which the reaction was carried out was 90° C. and the reaction time was 6 hours. 1,4-dichlorobutane was formed in substantial amount and high yields.

Example IV

In a glass-lined reaction vessel 36 g. of tetramethylene oxide was mixed with 259 g. of a 30% solution of anhydrous hydrogen bromide in glacial acetic acid. The reaction mixture was refluxed for 7 hours at a temperature of 90° C. It was then diluted with water and the 1,4-dibromo butane resulting separated by distillation. The yield of 1,4-dibromo butane was 83 g., corresponding to a percentage yield of 67% based on the tetramethylene oxide.

Various changes may be made in the process as described which would still come within the purview of my invention. It is not desired that the invention be restricted to the foregoing temperatures, times and amounts, given merely as illustrative, except as necessitated by the appended claims.

I claim:

1. The process of preparing 1,4-dihalogen butane which comprises reacting tetramethylene oxide with a hydrohalogen acid in the presence of a dehydrating acid, said reaction being carried out at substantially atmospheric pressure and under reflux.

2. The process of preparing 1,4-dihalogen butane which comprises reacting tetramethylene oxide with a hydrohalogen acid in a concentrated aqueous solution of sulfuric acid, said reaction being carried out at substantially atmospheric pressure and under reflux.

3. The process of preparing 1,4-dibromo butane which comprises reacting tetramethylene oxide with hydrobromic acid in the presence of a dehydrating agent, said reaction being carried out at substantially atmospheric pressure and under reflux.

4. The process of preparing 1,4-dichloro butane which comprises reacting tetramethylene oxide with hydrochloric acid in the presence of a dehydrating agent, said reaction being carried out at substantially atmospheric pressure and under reflux.

5. The process of preparing 1,4-dibromo butane which comprises reacting tetramethylene oxide with hydrobromic acid in a concentrated aqueous solution of sulfuric acid, said reaction being carried out at substantially atmospheric pressure and under reflux.

6. The process of preparing 1,4-dichloro butane which comprises reacting tetramethylene oxide with hydrochloric acid in a concentrated aqueous solution of sulfuric acid, said reaction being carried out at substantially atmospheric pressure and under reflux.

7. The process of preparing 1,4-dihalogen butane which comprises refluxing a solution of tetramethylene oxide and a hydrohalogen acid in the presence of a dehydrating acid, said reaction being carried out at substantially atmospheric pressure and under reflux.

8. The process of preparing 1,4-dihagolen butane which comprises reacting tetramethylene oxide with a hydrohalogen acid in the presence of a dehydrating acid, said reaction being carried out at substantially atmospheric pressure and under reflux, the molar ratio of the hydrohalogen acid to tetramethylene oxide ranging from 2.1 to 1 to 3 to 1.

9. The process of preparing 1,4-dihagolen butane which comprises reacting tetramethylene oxide with a hydrohalogen acid in an aqueous solution of sulfuric acid of 50 to 67% $H_2SO_4$ concentration, said reaction being carried out at substantially atmospheric pressure and under reflux.

10. The process of preparing 1,4-dihalogen butane which comprises reacting tetramethylene oxide with a hydrohalogen acid in the presence of glacial acetic acid, said reaction being carried out at substantially atmospheric pressure and under reflux.

11. The process of preparing 1,4-dibromo butane which comprises dissolving an alkali metal bromide in water, adding sulfuric acid thereto, adding thereafter tetramethylene oxide and refluxing the resultant mixture at substantially atmospheric pressure.

12. The process of preparing 1,4-dibromo butane which comprises dissolving an alkali metal bromide in water, slowly adding sulfuric acid thereto so as to secure a solution of sulfuric acid of 50 to 67% $H_2SO_4$ concentration, cooling said mixture, adding thereto tetramethylene oxide and refluxing the resultant mixture at substantially atmospheric pressure.

13. The process as defined in claim 12 wherein the reaction mixture is rapidly heated to the reflux temperature.

14. The method of preparing 1,4-dichloro butane which comprises dissolving an alkali metal chloride in water, adding sulfuric acid and tetramethylene oxide thereto, and refluxing the resultant mixture at substantially atmospheric pressure.

OLIVER W. CASS.